(12) United States Patent
Henry et al.

(10) Patent No.: US 7,493,964 B2
(45) Date of Patent: Feb. 24, 2009

(54) GROUND ENGAGING TOOL ALIGNMENT ASSEMBLY

(75) Inventors: Jim W. Henry, Saskatoon (CA); Blake R. Neudorf, Warman (CA)

(73) Assignee: CNH Canada, Ltd. (CA)

( * ) Notice: Subject to any disclaimer, the term of this patent is extended or adjusted under 35 U.S.C. 154(b) by 571 days.

(21) Appl. No.: 10/936,197

(22) Filed: Sep. 8, 2004

(65) Prior Publication Data

US 2006/0048954 A1    Mar. 9, 2006

(51) Int. Cl.
*A01B 35/22* (2006.01)

(52) U.S. Cl. .................. 172/762; 172/730; 172/772

(58) Field of Classification Search .................. 172/749, 172/750, 753, 762, 763, 764, 769, 772; 37/455, 37/456, 457
See application file for complete search history.

(56) References Cited

U.S. PATENT DOCUMENTS

| | | | |
|---|---|---|---|
| 109,352 A | 11/1870 | Smith | |
| 223,309 A | 1/1880 | Beebe | |
| 885,019 A | 4/1908 | Conley | |
| 989,729 A | 4/1911 | Swindle | |
| 3,061,021 A * | 10/1962 | Shader | 172/750 |
| 3,357,117 A | 12/1967 | Petersen | |
| 4,078,615 A * | 3/1978 | Kelley | 172/711 |
| 4,799,823 A | 1/1989 | Williams | |
| 4,819,737 A | 4/1989 | Frase | |
| 5,027,535 A * | 7/1991 | Maguina-Larco | 37/455 |
| 5,427,186 A * | 6/1995 | Adrian et al. | 172/701.3 |
| 5,465,796 A | 11/1995 | Buescher et al. | |
| 5,531,276 A | 7/1996 | Noonan et al. | |
| 5,558,165 A * | 9/1996 | Bucher et al. | 172/721 |
| 5,711,378 A | 1/1998 | Yeager | |
| 5,941,318 A | 8/1999 | Bergen | |
| 6,059,047 A | 5/2000 | Schimke | |
| 6,098,722 A | 8/2000 | Richard | |
| 6,116,172 A | 9/2000 | Prairie et al. | |
| 6,315,057 B1 | 11/2001 | Borter | |
| 6,315,058 B1 | 11/2001 | Birkenbach et al. | |
| 6,557,646 B1 | 5/2003 | Hurtis et al. | |
| 6,571,884 B1 * | 6/2003 | Horvath et al. | 172/730 |
| 6,814,151 B1 * | 11/2004 | Peck et al. | 172/750 |

* cited by examiner

*Primary Examiner*—Thomas B Will
*Assistant Examiner*—Joel F Mitchell
(74) *Attorney, Agent, or Firm*—Rebecca Henkel

(57) ABSTRACT

A tillage implement includes a ground engaging tool assembly configured to enhance alignment relative to a forward direction of travel of a tow vehicle. The ground engaging tool assembly generally includes a ground engaging tool, a shank, and clip coupled therebetween. The ground engaging tool includes a mounting portion that defines a channel configured to receive an upper portion of the clip. The shank includes a lower portion that defines an elongated slot configured to receive a lower portion of the clip. The clip is configured to align the mounting portion of the ground engaging tool with respect to the shank and the forward direction of travel. The mounting portion and associated clip are also configured to not cause undesired disturbance of the ground beyond the side-to-side width of the shank relative to the forward direction of travel.

20 Claims, 6 Drawing Sheets

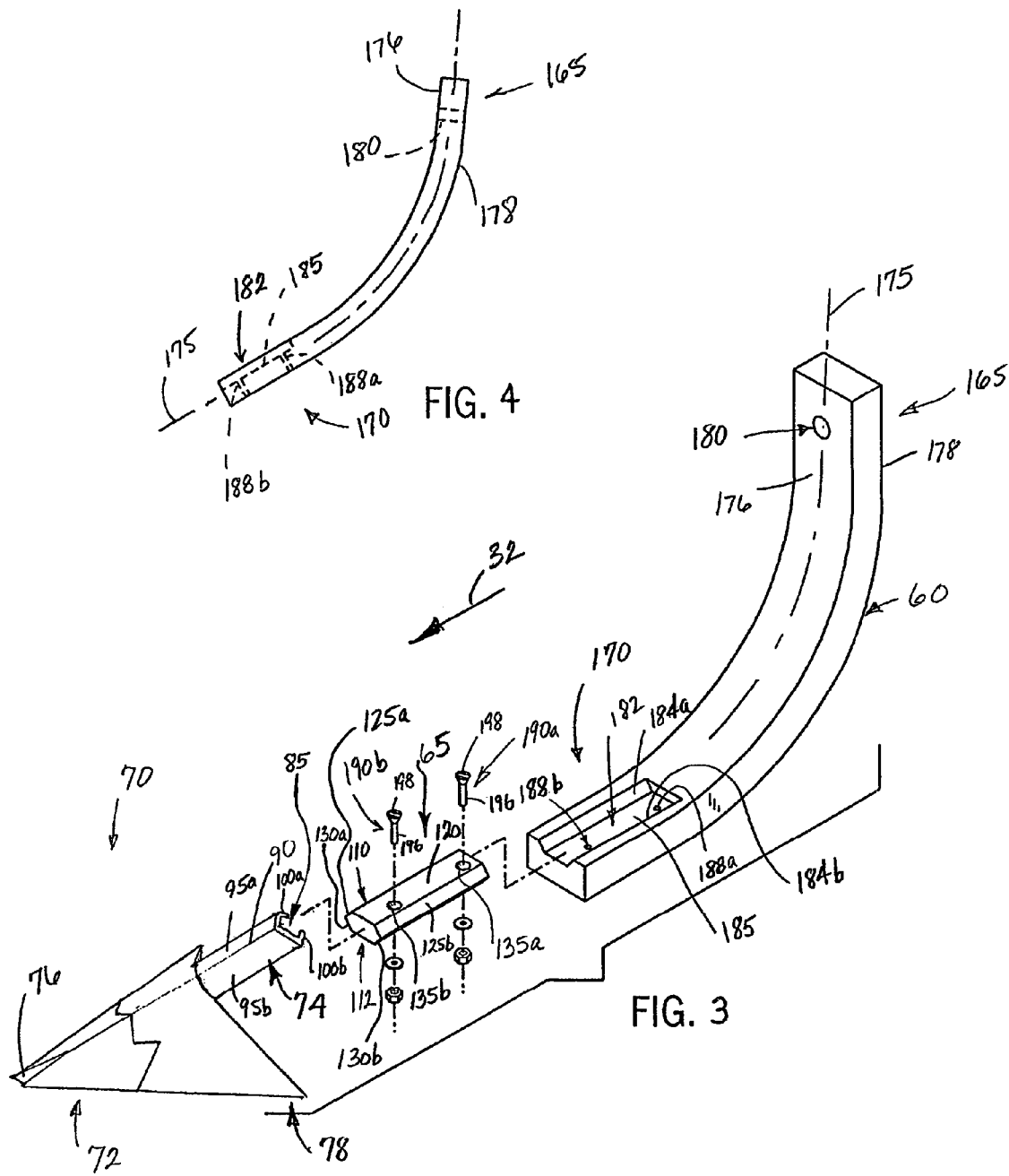

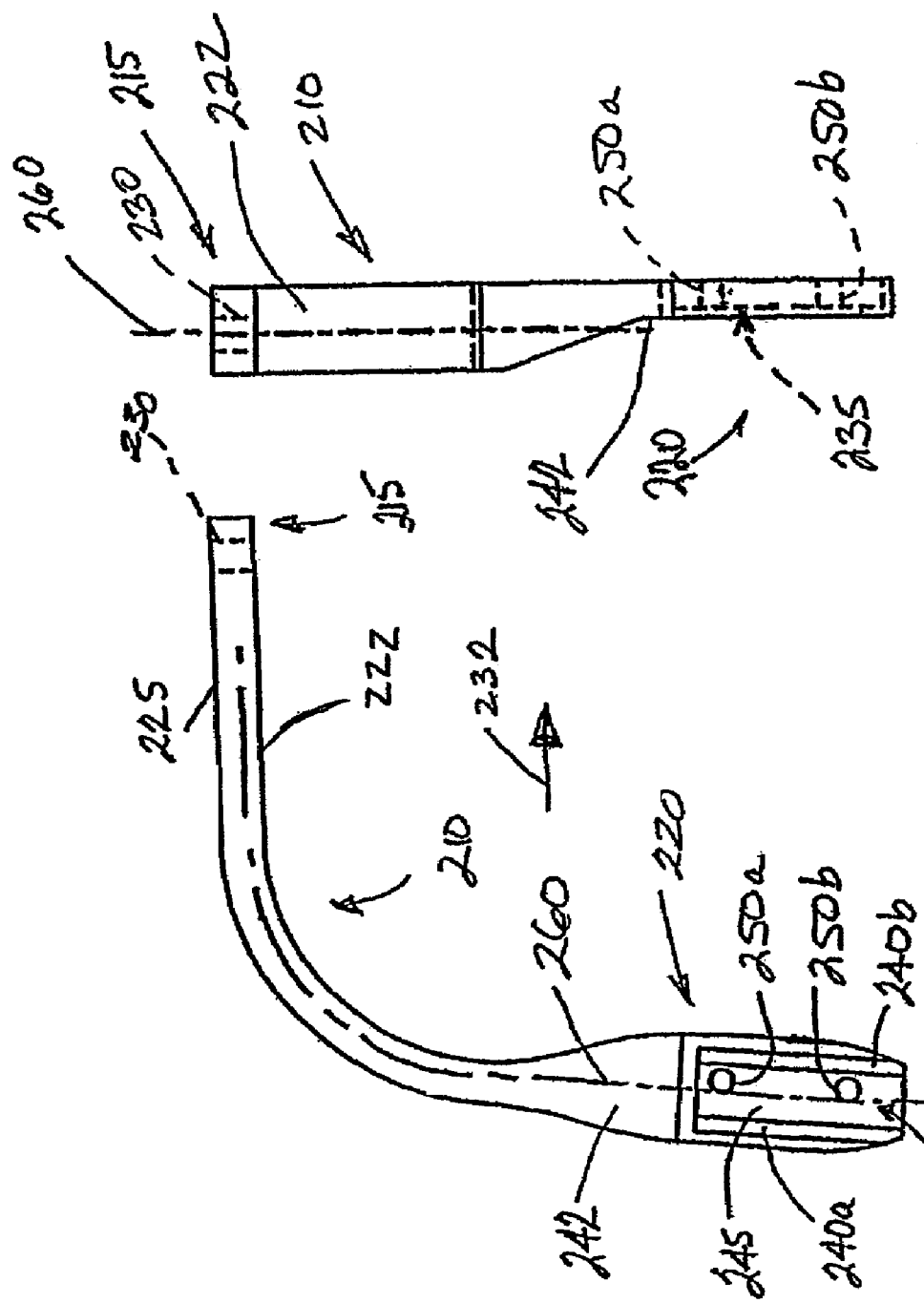

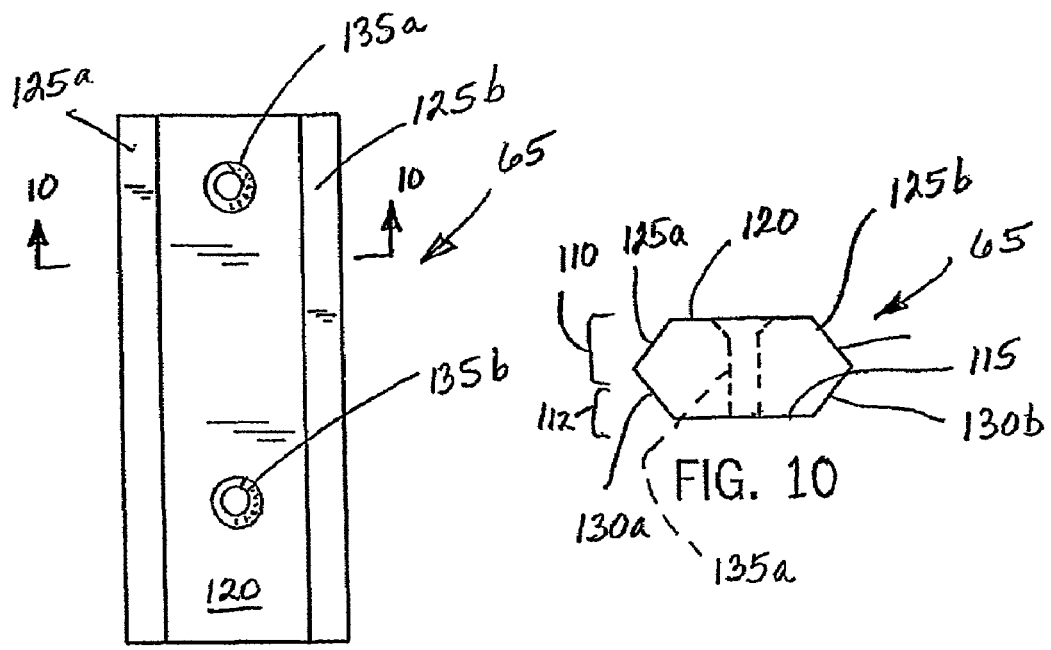
FIG. 9
FIG. 10
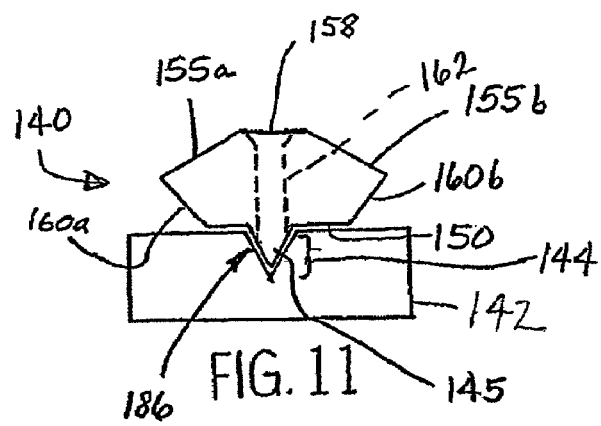
FIG. 11

GROUND ENGAGING TOOL ALIGNMENT ASSEMBLY

FIELD OF THE INVENTION

The present invention relates to an agricultural implement and, more particularly, to an assembly configured to support alignment of a ground engaging tool while in operation in an agricultural environment.

BACKGROUND OF THE INVENTION

A wide variety of ground engaging tools have been developed over the years for digging or tilling soil. Such tools have been designed for a variety of purposes and soil conditions. For example, sweep elements have evolved for the purpose of cutting vegetation and uplifting soil, as well as breaking up or mulching the surface of the soil, to prepare for planting and fertilizing. Ground engaging tools are also employed in cultivating agricultural soils to enhance conservation of soil moisture with minimal disturbance of the soil, which results in less erosion. Digging type machines e.g., back hoes, cable plows, and similar equipment also employ ground engaging tools supported in alignment by shanks. Typically, the ground engaging tool is frictionally held by the shank, or is welded thereto, to hold the ground engaging tool in place.

There is thus a desire for a ground engaging tool assembly that is interchangeable for the variety of purposes and soil conditions as described above. U.S. Pat. No. 3,357,117 to G. A. Peterson discloses a shank having a slot to receive a proximal end of a digging implement blade. The proximal end of the digging blade includes a downward extension having a T-shaped cross-section with a hole and a groove. The shank is slotted to receive the T-shaped extension of the blade. A resilient insert of elastomeric material slips through the hole and bends into the grooves to resist withdrawal of the blade from the shank. A drawback of this construction is that the grooves, slot, and multiple components are cumbersome to manufacture and interchange.

U.S. Pat. No. 5,711,378 to Yeager discloses an earth working tool assembly that includes a sweep coupled by an adaptor to a forward portion of a shank. The sweep includes a socket to receive the adaptor. The adaptor includes a pair of flanges configured to wrap around the forward portion of the shank, and is fastened to the shank by a pair of bolts. A drawback of the Yeager tool assembly is that the width of the adaptor and the adaptor's side flanges cause undesired disturbance of the soil beyond the width of the shank.

U.S. Pat. No. 6,315,057 to Borter illustrates a sweep apparatus having a sweep supported to a shank by a tine. The tine is coupled by a pair of fasteners to a forward surface of the shank. The sweep includes flanges configured to wrap around the tine. Similar to the drawback of the Yeager tool assembly, the Borter sweep apparatus includes sweep flanges that cause undesired disturbance of the soil beyond the width of the shank. Furthermore, the tolerance of the fasteners and fastener openings are not narrow enough to resist the multiple soil engaging forces acting on the sweep apparatus. Thereby, the tine and coupled sweep move out of alignment from the shank, leading to disproportionate wear on the sweep.

There is a desire for a ground engaging tool assembly that enhances alignment of the ground engaging tool with respect to the shank. Additionally, there is a need for a ground engaging tool alignment assembly that does not cause undesired disturbance of the soil beyond the width of the shank. Furthermore, there is a need for a ground engaging tool assembly that allows for ready interchangeability of the ground engaging tools on a ground engaging implement.

Therefore, a need has arisen to provide an improved ground engaging tool assembly configured to enhance operation of a ground engaging implement.

SUMMARY OF THE INVENTION

The present invention provides a ground engaging tool assembly configured to enhance alignment of a ground engaging tool mounted on a frame of an implement pulled by a tow vehicle across a ground surface.

One embodiment of the ground engaging tool assembly of the invention includes a shank in support of a ground engaging tool, and a clip coupled therebetween. The shank generally includes a lower portion that defines an elongated slot. The ground engaging tool generally includes a ground engaging end and a mounting portion, the mounting portion defining a channel. The clip generally includes a first portion and a second portion. The first portion of the clip is received in the slot defined by the lower portion of the shank. The second portion of the clip is received in the channel defined by the mounting portion of the ground engaging tool. The slot and the clip thereby align the ground engaging tool with the shank during ground engaging operation of the ground engaging tool assembly.

The preferred lower portion of the shank that defines the slot includes a plurality of slot faces, the plurality of slot faces including a bottom face, an open face opposite the bottom face, and a first sidewall and a second sidewall each extending upwardly and outwardly in opposite directions from the bottom face and toward the top face. The open face thus has a width greater relative to a width of the bottom face. The lower portion of the shank further includes a first shank opening and a second shank opening in communication with the slot. The first and second shank openings at the lower portion of the shank can be offset from a central longitudinal axis of the slot. Another embodiment of the slot defined by lower portion of the shank is rotated ninety degrees relative to a forward face of the shank relative to the forward direction of travel. The forward face of the shank has a shank width in a side-to-side direction transverse to the forward direction of travel.

The preferred mounting portion of the ground engaging tool includes an apex and a plurality of channel walls that define the channel. The plurality of channel walls include a first channel wall and a second channel wall that intersect at an apex, the first and second channel walls each diverging outwardly and downwardly relative to the apex; and a third channel wall and a fourth channel, the third channel wall extending inwardly and downwardly from the first channel wall and the fourth channel wall extending inwardly and downwardly from the second channel wall. The mounting portion of the ground engaging tool has a mount width across the first and second channel walls in a direction parallel to the shank width, and the shank width is at least equal to the mount width.

The preferred clip includes a bottom face, a top face, a first sidewall, a second sidewall, a third sidewall, and a fourth sidewall. The first and second sidewalls adjoin the top face, and are angled in a downward and opposite outward directions therefrom. The third and fourth sidewalls adjoin the bottom face and are angled in upward and opposite outward directions therefrom, such that the third sidewall adjoins with the first sidewall and the fourth sidewall adjoins with the second sidewall. The first and second sidewalls that define the slot are configured to engage the third and fourth sidewalls, respectively, of the clip.

The clip further includes a first clip opening and a second clip opening extending between the top face and the bottom face of the clip. In assembly, the first shank opening aligns with the first clip opening so as to receive a first fastener, and the second shank opening aligns with the second clip opening so as to receive a second fastener, the first and second fasteners coupling the clip to the shank. The mounting portion of the ground engaging tool that defines the channel of the ground engaging tool engages in contact with the first, second, third, and fourth sidewalls of the clip.

Another embodiment of the clip includes a first sidewall and a second sidewall that intersect or adjoin at an apex, the first and second sidewall angled outwardly in opposite directions and downwardly from the apex. The clip further includes a third sidewall and a fourth sidewall, the third sidewall angled downwardly and inwardly from the first sidewall and the fourth sidewall angled downwardly and inwardly from the second sidewall. The third and fourth sidewalls adjoin the bottom face of the clip.

The present invention further provides a method of aligning a ground engaging tool assembly. The ground engaging tool assembly includes a shank having a lower portion and an upper portion. The shank's upper portion is attached to a main frame of a ground engaging implement configured to be pulled by a tow vehicle in a direction of travel across a ground surface. The method includes the steps of providing a slot defined by the lower portion of the shank; providing a clip having a lower portion and an upper portion; providing a mounting portion of the ground engaging tool, the mounting portion defining a channel; disposing the lower portion of the clip in the slot defined by the lower portion of the shank; positioning the lower portion of the clip in the slot defined by the lower portion of the shank; aligning the mounting portion of the ground engaging tool with the slot of the shank via the clip disposed therebetween; coupling the ground engaging tool in alignment with the shank with the clip positioned therebetween.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 3 schematically illustrates an exploded isometric forward view of the ground engaging tool assembly of FIG. 2.

FIG. 4 schematically illustrates a detailed side elevation view of the shank of the ground engaging tool assembly of FIG. 2.

FIG. 5 schematically illustrates a cross-section view of the ground engaging tool assembly along line 5-5 in FIG. 2.

FIG. 7 illustrates a detailed side elevation view of a shank of the ground engaging tool assembly shown in FIG. 6.

FIG. 8 schematically illustrates a front view of the shank shown in FIG. 7.

FIG. 9 schematically illustrates a detailed top view of a first embodiment of a clip in accordance with the present invention.

FIG. 10 schematically illustrates an edge view of the clip shown in FIG. 2.

FIG. 11 schematically illustrates an edge view of a second embodiment of a clip in accordance with the present invention.

DETAILED DESCRIPTION OF THE PREFERRED EMBODIMENTS

A wide variety of ground engaging implements could be constructed in accordance with the present invention defined by the claims. Hence, while preferred embodiments of the invention will now be described with reference to an agricultural tillage implement, it should be understood that the invention is not so limited. The type of ground engaging implement (e.g., backhoe, cable digger, etc.) can vary. Furthermore, while the description refers to a ground engaging tool assembly employing a sweep, the invention can be utilized with a wide variety of ground engaging tools (e.g., blade, etc.) and is not limiting on the invention.

Figure 1:
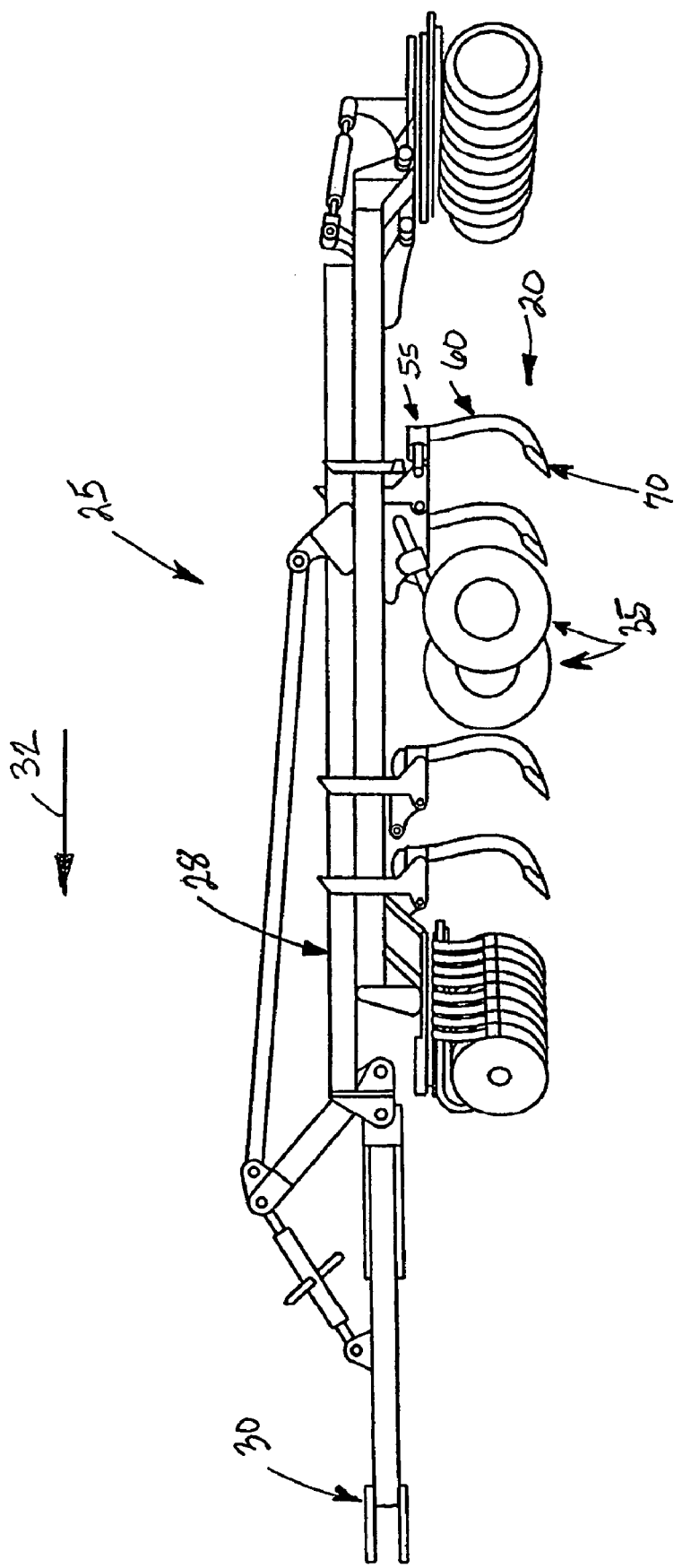
FIG. 1 illustrates a side elevation view of a grounding engagement in accordance with the present invention.

FIG. 1 illustrates a ground engaging implement employing one embodiment of a ground engaging tool assembly 20 in accordance with the present invention. The preferred ground engaging implement shown is an agricultural tillage implement 25 having a rigid main frame 28 adapted to be attached at its front to the rear of a tow vehicle (e.g., tractor) (not shown) by means of a conventional hitch 30. The main frame 28 generally includes a structure comprising a series of elongated inside frame members and outside frame members affixed to one or more front and/or rear transverse support members. Fasteners (e.g., weld, bolts, etc.) (not shown) securely interconnect this structure, creating a clean and simple design capable of handling tough soil and residue conditions. The main frame 28 is supported for movement in a forward direction of travel (illustrated as arrow 32) across a field or along a road by wheels 35. The ground engaging implement 25 further includes at least one ground engaging tool assembly 20 to engage the ground.

Figure 2:
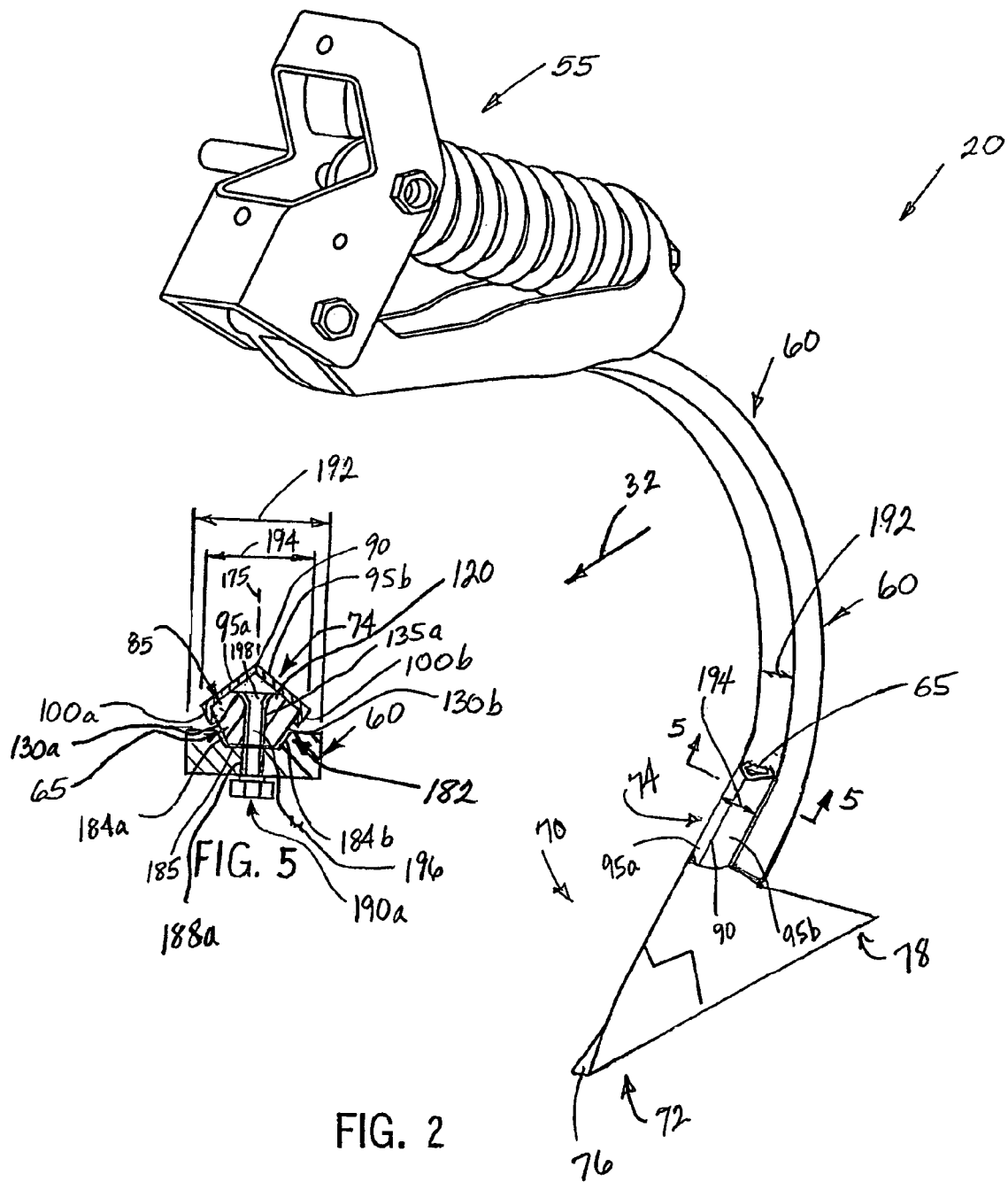
FIG. 2 schematically illustrates a detailed isometric forward view of the ground engaging tool assembly in accordance with the present invention.

Referring to FIGS. 1 and 2, the ground engaging tool assembly 20 generally includes a tool mounting bracket assembly 55 in support of a shank 60 to the main frame 28 of the implement 25 (See FIG. 1). The shank 60 is coupled or interconnected by a tool alignment clip 65 (See FIGS. 2 and 3) with a ground engaging tool such as a sweep 70.

As shown in FIGS. 2 and 3, the exemplary sweep 70 generally includes a forward portion or ground engaging end 72 and a mounting portion 74 in distal relation thereto relative to the forward direction of travel 32. The ground engaging end 72 generally includes a tip 76 having beveled edge margins and a relatively flat underside surface, which those skilled in the art understand can vary in shape (e.g., curve, etc.) to achieve desired effects in engaging the ground. The ground engaging end 72 diverges in an outward direction and a rearward direction from the tip 76 toward a pair of opposed wing portions 78 relative to the forward direction of travel 32. The mounting portion 74 is disposed upwardly and rearwardly relative to the ground engaging end 72. The sweep 70 is preferably comprised of a durable economical metal such as steel, but the composition of the sweep 70 can vary. Although the illustrated ground engaging tool shown is a sweep 70, the type of ground engaging tool (e.g., coulters, blades, sweeps, plows, prongs, etc.) can vary and is not limiting on the invention.

Referring now to FIG. 3, the exemplary mounting portion 74 of the sweep 70 defines an upwardly and rearwardly extended channel 85 extending generally in parallel relation relative to the shank 60, relative to the forward direction of travel 32 of the implement 25. As illustrated in FIGS. 3 and 5, the channel 85 is generally complimentary-shaped to receive the clip 65. The channel 85 is generally defined by an apex 90 and a series of channel walls, such as a first pair of channel walls 95a and 95b and a second pair of channel walls 100a and 10b. The first pair of channel walls 95a and 95b intersect or adjoin with the apex 90 and each diverges in a downward and opposite outward directions therefrom. The channel wall 100a extends inward and downward relative to the channel wall 95a, and the channel wall 100b extends inward and downward relative to the channel wall 95b. The shape of the channel 85 defined by the mounting portion 74 can vary with the associated shape of the clip 65.

Still referring to FIGS. 3 and 5, the channel walls 95a, 95b, 100a, and 100b, are generally configured to engage the clip 65, thereby coupling the sweep 70 to the shank 60. Frictional forces and forces associated with operation of the implement 25 generally hold the mounting portion 74 of the sweep 70 in engagement with the clip 65. Alternatively, the mounting portion 74 may further include openings (not shown) configured to receive fasteners (not shown) attaching the sweep 70 with the clip 65 as well as the shank 60.

FIG. 3 illustrates that the clip 65 is configured to couple between the mounting portion 74 of the sweep 70 and the lower portion of the shank 60. FIGS. 3, 5, 9 and 10 illustrate the exemplary clip 65 in accordance with the present invention. As shown in FIG. 10, the clip 65 generally includes an upper portion 110 and a lower portion 112. The upper portion 110 of the clip 65 is shaped to correspond with and engage the walls 95a, 95b, 100a and 100b that define the channel 85 of the mounting portion 74 (See FIGS. 3 and 5) of the sweep 70. The lower portion 112 of the clip 65 is configured to correspond and engage a slot (discussed later) defined by the lower portion of the shank 60 (See FIGS. 3 and 5).

Referring to FIGS. 9 and 10, the lower portion 112 of the clip 65 includes a bottom face 115 opposite a top face 120 of the upper portion 110 of the clip 65. The upper portion 110 of the clip 65 also includes a first pair of sidewalls 125a and 125b angled in an outward and a downward direction from the top face 120. The lower portion 110 of the clip 65 also includes a second pair of sidewalls 130a and 130b each angled in an upward and opposite outward directions from the bottom face 115 of the clip 65. The clip may include more intermediary sidewalls and faces than described herein. As illustrated in FIG. 9, the clip 65 further includes a first pair of clip openings 135a and 135b which extend between the top face 120 of the upper portion 112 and the bottom face 115 of the lower portion 110 of the clip 65. Although the exemplary clip 65 is shown having six faces, the shape of the clip can vary (e.g., polygonal, curvilinear, etc.) and is not limiting on the invention.

FIG. 11 illustrates an end view of another embodiment of a clip 140 in combination with a shank 142 in accordance with the present invention. A lower portion 144 of the clip 140 generally includes an extension 145 that is V-shaped in cross-section and extending from a bottom face 150. The clip 140 also includes a first pair of sidewalls 155a and 155b each angled in an outward and a downward direction from a top face 158. The clip also includes a second pair of sidewalls 160a and 160b that adjoin the bottom face 150. The sidewalls 160a and 160b each diverge, or are angled in upward and opposite outward directions, from the bottom face 150. The clip 140 may include more intermediary sidewalls and faces located therebetween. The clip 140 further includes a first pair of openings 162 configured to receive fasteners (not shown) coupling the clip 140 with the shank 142 (discussed later).

Referring back to FIGS. 3 and 4, the exemplary shank 60 is generally elongated and arcuate shaped, and includes a generally constant and relatively narrow cross-section. Yet, the shape and type of shank 60 can vary. As illustrated in FIGS. 3 and 4, the exemplary shank 60 is C-shaped, and thus is commonly referred to by those skilled in the art as a "C-shank." The shank 60 includes an upper end portion 165, and a lower end portion 170 that define a longitudinal axis 175. The lower end portion 170 is disposed opposite the upper end portion 165. The shank 60 includes a forward face 176 and a rearward face 178 and one or more openings 180 extending therebetween relative to the forward direction of travel 32 of the implement 25. The openings 180 are configured to receive one or more fasteners coupling the upper portion 165 of the shank 60 to the tool mounting bracket assembly 55. (See FIG. 2).

Still referring now to FIGS. 3 and 4, the lower portion 170 of the shank 60 defines a slot 182 centrally disposed along the longitudinal axis 175. The slot 182 is generally trapezoidal-shaped and extends generally parallel relative to the longitudinal axis 175 of the shank 60. The shape and dimension of the slot 182 can vary in accordance to the associated shape of the clip 65 (See FIG. 5). Referring specifically to FIG. 3, the slot 182 of the shank 60 and the attached clip 65 are configured so as to align the mounting portion 74 of the attached sweep 70 relative to the longitudinal axis 175 of the shank 60 during typical ground engaging operation of the implement 20.

Referring to FIGS. 3 and 5, the slot 182 at the lower portion 170 of the shank 60 is generally defined by a series faces, such as a pair of sidewalls 184a and 184b and a bottom face 185 extending therebetween. The sidewalls 184a and 184b and the bottom face 185 are generally configured to receive and engage the lower portion 112 (See FIG. 10) of the clip 65. The sidewalls 184a and 184b each generally diverge in upward and opposite outward directions from the bottom face 185. The sidewalls 184a and 184b are generally linear-shaped to receive the sidewalls 130a and 130b of the clip 65 (See FIG. 5). Referring specifically to FIG. 3, the lower portion 170 of the shank 60 further includes a pair of openings 188a and 188b in communication with the slot 182. The openings 188a and 188b are configured to align with openings 135a and 135b of the clip 65 in such a manner as to receive fasteners 190a and 190b coupling the clip 65 to the shank 60. Although a three faced slot 182 is illustrated, it is understood that the shape (e.g., arcuate, stepped, rectangular, etc.) of the slot 182 can vary in accordance with the shape of the clip 65. For example, FIG. 11 illustrates a C-type shank 142 having a V-shaped slot 186 to receive the V-shaped extension 145 of the clip 140 described above.

411 Referring now to FIGS. 2 and 5, the shank 60 includes a side-to-side width 192 across the forward face 176 and transverse to the forward direction of travel 32 of the implement 25 (See FIG. 1). The mounting portion 74 of the sweep 70 includes a side-to-side width 194 across the sidewalls 90a and 90b and parallel to the side-to-side width 192 of the shank 60. The clip 65 is configured to couple the mounting portion 74 of the sweep 70 to the shank 60 such that the side-to-side width 192 of the shank 60 is at least equal to the side-to-side width 194 of the mounting portion 74. Thereby, the ground engaging tool assembly 20 does not undesirably increase the disturbance of the ground beyond the side-to-side width 192 of the shank 60 relative to the forward direction of travel 32 of the implement 25 (See FIG. 1).

Referring to FIGS. 3 and 5, the exemplary fasteners 190a and 190b each include a threaded portion 196 and a head portion 198. The head portion 198 is configured to mount flush in each opening 188a and 188b relative to the top surface 120 of the clip 65. Of course, the type of fasteners 190a and 190b can vary.

Figure 6:
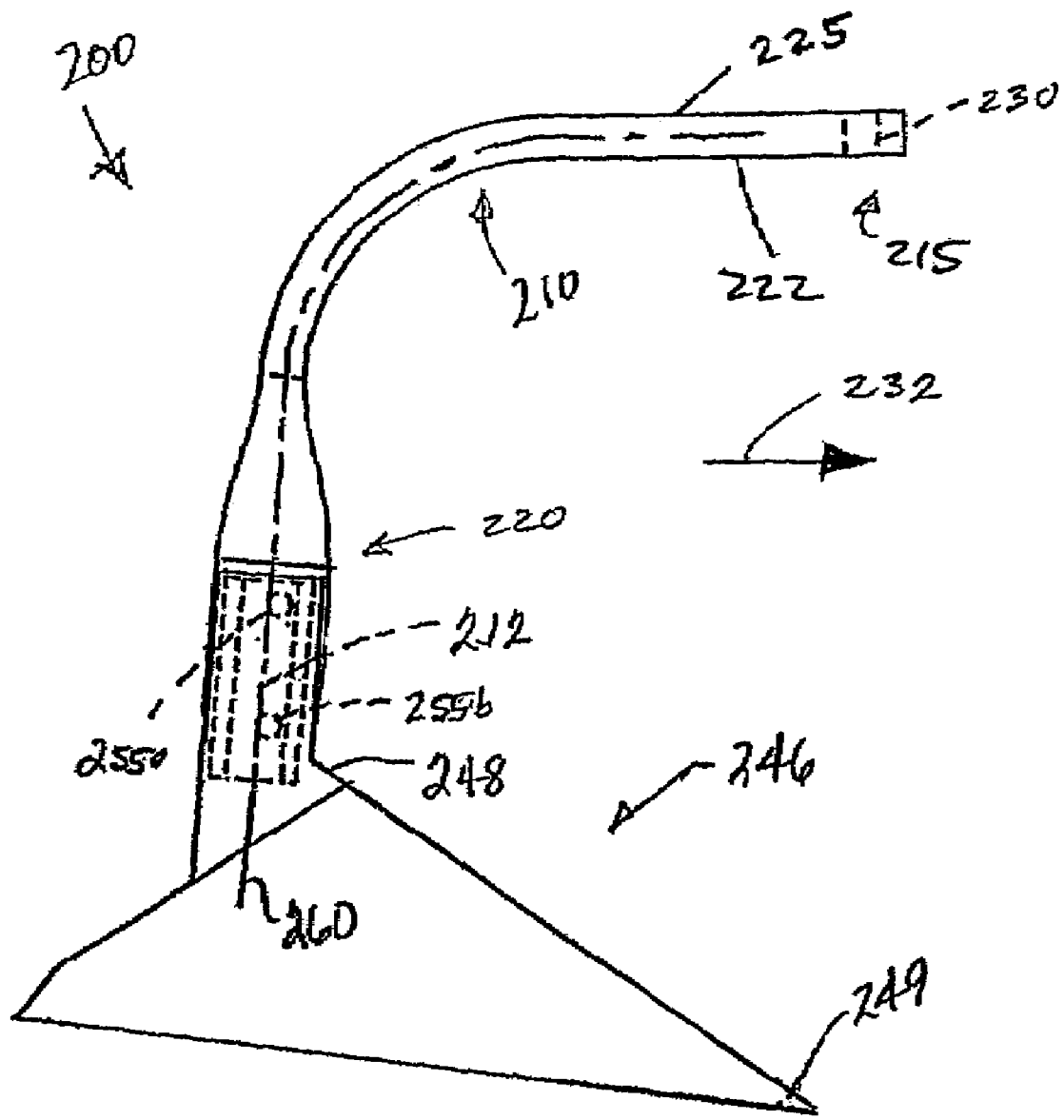
FIG. 6 illustrates a side elevation view of another embodiment of a ground engaging tool assembly in accordance with the present invention.

FIGS. 6-8 illustrate another embodiment of a ground engaging tool assembly 200 of the invention. The ground engaging tool assembly 200 includes a shank 210 configured with a clip 212 (shown by dashed lines), similar to the clip 65 described above. Referring specifically to FIGS. 7 and 8, the shank 210 includes an upper end portion 215 and a lower end portion 220. The upper end portion 215 includes a forward face 222, a rearward face 225 and an opening 230 (shown by dashed lines) extending therebetween configured to receive a fastener (not shown) coupling the tool assembly 200 to a tool mounting bracket assembly (not shown), similar to the ground engaging tool assembly 20 described above, for travel in a forward direction (illustrated by arrow 232). Referring specifically to FIG. 7, the lower end portion 220 of the shank 210 includes a slot 235 defined by slot sidewalls 240a and 240b and a bottom face 245, similar to the slot 182 defined by the shank 60 described above. Yet, in contrast to slot 182, the slot 235 is located along a side face 242 of the shank 210 which is generally perpendicular relative to the forward face 222 of the shank 210.

Referring to FIG. 6, the sweep 246 includes a mounting portion 248 and tip 249. The mounting portion 248 is configured to receive the clip 212 (shown by dashed lines) in a manner similar to the mounting portion 174 and clip 65 described above. However, in contrast to the mounting portion 74 described above, the mounting portion 248 is oriented or aligned generally transverse to the tip 249 so as to be in general alignment to receive the clip 212.

Referring again to FIGS. 7-8, the lower end portion 220 of the shank 210 further includes a pair of openings 250a and 250b in communication with the slot 235 that are configured to align with openings 255a and 255b in the clip 212 (See FIG. 6) in such a manner so as to receive fasteners (not shown) coupling the clip 212 to the shank 210. Of course, the number, shape and alignments of the shank openings 250a and 250b and the clip openings 255a and 255b can vary. As illustrated in FIGS. 6 and 8, the openings 250a and 250b of the shank 210 (FIG. 8) and the associated openings 255a and 255b of the clip 212 (FIG. 6) can be offset from a central longitudinal axis 260 of the slot 212 and shank 210 to enhance strength to resist the dynamic forces associated with ground engaging operation of the implement 25 (FIG. 1).

In operation, an operator positions the tool mounting bracket assembly 55 and the shank 60 on the main frame 28 of the ground engaging implement 20. The lower portion 112 of the clip 65 inserts in the slot 182 defined by the lower end portion 170 of the shank 60. The lower portion 112 of the clip 65 is coupled in the slot 182 via fasteners 190a and 190b extending through the openings 188a and 188b in the shank 60 and openings 135a and 135b in the clip 65. An operator secures the mounting portion 74 of the ground engaging tool to the shank 60 via the clip 65 coupled therebetween. Alignment of the mounting portion 74 of the sweep 70 with the shank 60 is accomplished by inserting the upper portion 110 of the clip 65 into the channel 85 defined by the mounting portion 74 of the sweep 70. The clip 65 keeps the sweep 70 aligned with the shank 60 during operation of the ground engaging tool assembly 20. The sweep 70 can be readily interchanged with other tools known in the art without disassembling the ground engaging tool assembly 20.

Many changes and modifications could be made to the invention without departing from the spirit thereof. The scope of these changes will become apparent from the appended claims.

We claim:

1. A ground engaging tool assembly configured to be mounted to a main frame of a ground engaging implement pulled by a tow vehicle in a forward direction of travel, comprising:
    a shank having a lower portion that defines a slot and having a first width generally defined transverse to a length of the slot;
    a ground engaging tool having a ground engaging end and a mounting portion, the mounting portion having a second width less than the first width; and
    a clip having a first portion and a second portion, the first portion of the clip positioned in the slot defined by the lower portion of the shank, the second portion of the clip received by the mounting portion of the ground engaging tool,
    wherein:
        the slot is directed towards the mounting portion of the ground engaging tool; and
        the slot in the lower portion of the shank and the clip attached thereon align the ground engaging tool relative to the forward direction of travel.

2. The ground engaging tool assembly as recited in claim 1, wherein the clip comprises:
    a bottom face;
    a top face located opposite the bottom face;
    a first sidewall and a second sidewall, the first sidewall adjoined with the top face and the second sidewall adjoined with the top face, the first and the second sidewalls each angled in a downward direction and opposite outward directions from the top face; and
    a third sidewall and a fourth sidewall adjoined with the bottom face, wherein the third and fourth sidewalls each are angled in an upward direction and opposite outward directions from the bottom face.

3. The ground engaging tool assembly as recited in claim 2, wherein the lower portion of the shank that defines the slot comprises a plurality of slot faces defined therein, the plurality of slot faces comprising:
    a bottom face having a first width;
    an open face opposite the bottom face of the slot, the open face having a second width that is greater than the first width of the bottom face; and
    a first sidewall and a second sidewall each extending in an upward and opposite outward directions from the bottom face toward the open face,
wherein the first and second sidewalls that define the slot engage the third and fourth sidewalls, respectively, of the clip.

4. The ground engaging tool assembly as recited in claim 2, wherein the lower portion of the shank includes a first shank opening and a second shank opening in communication with the slot, wherein the clip includes a first clip opening and a second clip opening extending between the top face and the bottom face of the clip, wherein the first clip opening aligns with the first shank opening to receive a first fastener and the second clip opening aligns with the second shank opening to receive a second fastener, the first and second fasteners attaching the clip to the shank.

5. The ground engaging tool assembly as recited in claim 4, wherein the slot defines a central longitudinal axis, and wherein the first and second shank openings at the lower portion of the shank are offset from the central longitudinal axis.

6. The ground engaging tool assembly as recited claim 1, wherein the mounting portion of the ground engaging tool includes a plurality of channel walls that define a channel, the plurality of channel walls comprising:
   a first channel wall and a second channel wall that intersect at an apex, the first and second channel walls each diverging in downward and opposite outward directions from the apex; and
   a third channel wall and a fourth channel, the third channel wall extending inward and downward from the first channel wall and the fourth channel wall extending inward and downward from the second channel wall.

7. The ground engaging tool assembly as recited in claim 1, wherein the shank includes a forward face and a rearward face and an opening extending therebetween relative to the forward direction of travel, wherein the shank further includes a first side face that is perpendicular to the forward face, and wherein the slot is located along the first side face of the shank.

8. The ground engaging tool assembly as recited in claim 1, wherein the clip comprises a V-shaped extension.

9. The ground engaging tool assembly of claim 8, wherein the slot defined by the shank is V-shaped to receive the V-shaped extension of the clip.

10. The ground engaging tool assembly as recited in claim 7, wherein the forward face of the shank has a shank width in a side-to-side direction transverse to the forward direction of travel, and wherein the mounting portion of the ground engaging too has a mount width across the first and second channel walls in a direction parallel to the shank width, and wherein the shank width is at least equal to the mount width.

11. A ground engaging implement configured to be pulled by a tow vehicle in a forward direction of travel, comprising:
   a main frame having a hitch configured to couple the main frame to the tow vehicle;
   a shank connected to the main frame, the shank having a lower portion that defines a slot;
   a ground engaging tool having a ground engaging tip located opposite an elongated mounting portion; and
   a clip having a first portion and a second portion, the first portion of the clip received in the slot defined by the lower portion of the shank, the second portion of the clip received by the elongated mounting portion of the soil engaging tool, and wherein the clip has a leading end configured to abut a stop wall formed in the shank and defining an end of the slot when the clip is received in the shank and a trailing end opposite the leading end that is proximate the elongated mounting portion when the clip is received in the shank and wherein the leading end has a profile matched to that of the trailing end, wherein:
   the slot is directed towards the mounting portion of the ground engaging tool; and
   the slot at the lower portion of the shank and the attached clip are configured to align the attached ground engaging tool relative to the forward direction of travel of the implement.

12. The ground engaging implement as recited in claim 11, wherein the shank has a forward face relative to the forward direction of travel, the forward face having a shank width in a side-to-side direction relative to the forward direction of travel, and wherein the mounting portion of the ground engaging tool has a mount width in a direction parallel to the shank width, the shank width being at least equal to the mount width.

13. The ground engaging implement as recited in claim 11, wherein the clip comprises a bottom face having a V-shaped extension extending therefrom.

14. The ground engaging implement as recited in claim 13, wherein the lower portion of the shank includes a first shank opening and a second shank opening in communication with the slot, wherein the clip includes a first clip opening and a second clip opening, wherein the first clip opening aligns with the first shank opening to receive a first fastener and the second clip opening aligns with the second shank opening to receive a second fastener, the first and second fasteners coupling the clip with the shank.

15. The ground engaging implement as recited in claim 13, wherein the slot defined by the shank is V-shaped to receive the V-shaped extension of the clip.

16. The ground engaging implement of claim 11, wherein the slot of the lower portion of the shank is generally defined by a bottom face having a first width, an open face opposed to the bottom face of the slot, and a first sidewall and a second sidewall each extending upwardly and outwardly from the bottom face toward the open face, wherein the open face has a second width that is greater relative to the first width of the bottom face.

17. The ground engaging implement of claim 11, wherein the shank includes a forward face and a rearward face and an opening extending therebetween relative to the forward direction of travel, wherein the shank further includes a first side face that is perpendicular to the forward face, and wherein the slot is located along the first side face of the shank.

18. The ground engaging implement of claim 11, wherein the clip comprises:
   a top face and a bottom face;
   a first sidewall and a second sidewall each angled outwardly and downwardly from the top face; and
   a third sidewall and a fourth sidewall, the third and fourth sidewalls angled upwardly and outwardly from the bottom face; and
   a V-shaped extension extending from the bottom face.

19. The ground engaging implement as recited in claim 18, where the slot defined by the shank is V-shaped to receive the V-shaped extension of the clip.

20. A method of aligning a ground engaging tool with a shank, the shank having a lower portion and an upper portion, the shank upper portion attached to a main frame of a ground engaging implement configured to be pulled by a tow vehicle in a forward direction of travel, the method comprising the steps of:
   inserting a first portion of a clip in a slot defined by a lower portion of a shank of the ground engaging implement until a leading end of the first portion has engaged a wall of the shank defining an end of the slot; and
   receiving a second portion of the clip in a mounting portion of a ground engaging tool, the ground engaging tool having a ground engaging end opposite the mounting portion,
wherein:
   the slot is directed towards the mounting portion of the ground engaging tool; and
   the slot at the lower portion of the shank and the clip align the ground engaging tool in the forward direction of travel of the ground engaging implement.

* * * * *